US010812358B2

(12) United States Patent
Krishnan et al.

(10) Patent No.: US 10,812,358 B2
(45) Date of Patent: *Oct. 20, 2020

(54) PERFORMANCE-BASED CONTENT DELIVERY

(71) Applicant: Amazon Technologies, Inc., Seattle, WA (US)

(72) Inventors: Prasanth Krishnan Krishnasamy Navaneetha Krishnan, Chennai (IN); Vengadanathan Srinivasan, Madurai (IN); Saharsh Tibrewal, Kolkata (IN); Rajeev Kumar Pandey, Dhanbad (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/702,501

(22) Filed: Sep. 12, 2017

(65) Prior Publication Data

US 2018/0007121 A1    Jan. 4, 2018

Related U.S. Application Data

(63) Continuation of application No. 14/572,705, filed on Dec. 16, 2014, now Pat. No. 9,769,248.

(51) Int. Cl.
*H04L 29/06* (2006.01)
*H04L 12/26* (2006.01)
*H04L 29/08* (2006.01)

(52) U.S. Cl.
CPC ......... *H04L 43/0876* (2013.01); *H04L 43/00* (2013.01); *H04L 67/22* (2013.01); *H04L 67/28* (2013.01)

(58) Field of Classification Search
CPC ......... H04L 43/00; H04L 43/08; H04L 67/22; H04L 67/28

(Continued)

(56) References Cited

U.S. PATENT DOCUMENTS 5,649,185 A    7/1997    Antognini et al.
5,664,106 A    9/1997    Caccavale (Continued)

OTHER PUBLICATIONS

Al-Fares, M. et al., A Scalable, Commodity Data Center Network Architecture, SIGCOMM '08 Proceedings, Aug. 17, 2008, pp. 63-74, 66-68, 70-71, Seattle, WA.

(Continued)

*Primary Examiner* — Glenford J Madamba
(74) *Attorney, Agent, or Firm* — Knobbe Martens Olson & Bear LLP

(57) ABSTRACT

Systems and methods for performance-based content delivery are disclosed. A performance management service can define client performance categories based on performance data regarding content requesting, delivery and rendering, and thereby enable content providers to generate or update content based on characteristics of different performance categories in order to improve user experience. The performance management service may also predict performance categories for clients with respect to their currently submitted content requests based on applicable client classification criteria. The performance management service can provide the category prediction to content providers so that a version of the requested content appropriate for the predicted category is transmitted to the client.

21 Claims, 6 Drawing Sheets

(58) Field of Classification Search
USPC .................................................. 709/217
See application file for complete search history.

(56) References Cited

U.S. PATENT DOCUMENTS

| | | |
|---|---|---|
| 5,819,033 A | 10/1998 | Caccavale |
| 5,832,517 A | 11/1998 | Knutsen, II |
| 5,999,636 A | 12/1999 | Juang |
| 6,173,322 B1 | 1/2001 | Hu |
| 6,182,125 B1 | 1/2001 | Borella et al. |
| 6,185,598 B1 | 2/2001 | Farber et al. |
| 6,243,761 B1 | 6/2001 | Mogul et al. |
| 6,377,257 B1 | 4/2002 | Borrel et al. |
| 6,438,592 B1 | 8/2002 | Killian |
| 6,473,804 B1 | 10/2002 | Kaiser et al. |
| 6,529,910 B1 | 3/2003 | Fleskes |
| 6,553,419 B1 | 4/2003 | Ram |
| 6,633,324 B2 | 10/2003 | Stephens, Jr. |
| 6,662,233 B1 | 12/2003 | Skarpness et al. |
| 6,697,805 B1 | 2/2004 | Choquier et al. |
| 6,698,013 B1 | 2/2004 | Bertero et al. |
| 6,714,975 B1 | 3/2004 | Aggarwal et al. |
| 6,820,133 B1 | 11/2004 | Grove et al. |
| 6,920,498 B1 | 7/2005 | Gourlay et al. |
| 6,978,418 B1 | 12/2005 | Bain et al. |
| 7,009,943 B2 | 3/2006 | O'Neil |
| 7,065,496 B2 | 6/2006 | Subbloie et al. |
| 7,085,825 B1 | 8/2006 | Pishevar et al. |
| 7,096,193 B1 | 8/2006 | Beaudoin et al. |
| 7,107,273 B2 | 9/2006 | Ohata et al. |
| 7,114,160 B2 | 9/2006 | Suryanarayana et al. |
| 7,120,871 B1 | 10/2006 | Harrington |
| 7,185,084 B2 | 2/2007 | Sirivara et al. |
| 7,269,657 B1 | 9/2007 | Alexander et al. |
| 7,343,399 B2 | 3/2008 | Hayball et al. |
| 7,346,676 B1 | 3/2008 | Swildens et al. |
| 7,373,599 B2 | 5/2008 | McElfresh et al. |
| 7,523,181 B2 | 4/2009 | Swildens et al. |
| 7,555,542 B1 | 6/2009 | Ayers et al. |
| 7,581,224 B2 | 8/2009 | Romero |
| 7,596,150 B2 | 9/2009 | Baird et al. |
| 7,623,460 B2 | 11/2009 | Miyazaki |
| 7,650,376 B1 | 1/2010 | Blumenau |
| 7,653,725 B2 | 1/2010 | Yahiro et al. |
| 7,676,570 B2 | 3/2010 | Levy et al. |
| 7,685,270 B1 | 3/2010 | Vermeulen et al. |
| 7,685,273 B1 | 3/2010 | Anastas et al. |
| 7,698,418 B2 | 4/2010 | Shimada et al. |
| 7,707,071 B2 | 4/2010 | Rigole |
| 7,707,173 B2 | 4/2010 | Nanavati et al. |
| 7,725,658 B2 | 5/2010 | Lang et al. |
| 7,748,005 B2 | 6/2010 | Romero et al. |
| 7,752,301 B1 | 7/2010 | Maiocco et al. |
| 7,756,032 B2 | 7/2010 | Feick et al. |
| 7,765,295 B2 | 7/2010 | Anastas et al. |
| 7,860,735 B2 | 12/2010 | Evanitsky |
| 7,865,594 B1 | 1/2011 | Baumback et al. |
| 7,873,065 B1 | 1/2011 | Mukerji et al. |
| 7,904,875 B2 | 3/2011 | Hegyi |
| 7,925,782 B2 | 4/2011 | Sivasubramanian et al. |
| 7,930,393 B1 | 4/2011 | Baumback et al. |
| 7,933,988 B2 | 4/2011 | Nasuto et al. |
| 7,937,456 B2 | 5/2011 | McGrath |
| 7,961,736 B2 | 6/2011 | Ayyagari |
| 8,051,166 B1 | 11/2011 | Baumback et al. |
| 8,069,231 B2 | 11/2011 | Schran et al. |
| 8,117,306 B1 | 2/2012 | Baumback et al. |
| 8,122,124 B1 | 2/2012 | Baumback et al. |
| 8,165,915 B1 * | 4/2012 | Lucash ............... G06Q 30/02 705/14.4 |
| 8,286,176 B1 | 10/2012 | Baumback et al. |
| 8,296,429 B2 | 10/2012 | Baumback et al. |
| 8,316,124 B1 | 11/2012 | Baumback et al. |
| 8,452,870 B2 | 5/2013 | Baumback et al. |
| 8,463,877 B1 | 6/2013 | Richardson |
| 8,468,245 B2 | 6/2013 | Farber et al. |
| 8,489,737 B2 | 7/2013 | Baumback et al. |
| 8,667,127 B2 | 3/2014 | Bettis et al. |
| 8,762,526 B2 | 6/2014 | Baumback et al. |
| 8,843,625 B2 | 9/2014 | Baumback et al. |
| 9,071,502 B2 | 6/2015 | Baumback et al. |
| 9,088,460 B2 | 7/2015 | Baumback et al. |
| 9,118,543 B2 | 8/2015 | Baumback et al. |
| 9,160,641 B2 | 10/2015 | Baumback et al. |
| 9,210,099 B2 | 12/2015 | Baumback et al. |
| 9,367,929 B2 | 6/2016 | Bettis et al. |
| 9,491,073 B2 | 11/2016 | Baumback et al. |
| 9,628,403 B2 | 4/2017 | Baumback et al. |
| 9,660,890 B2 | 5/2017 | Baumback et al. |
| 9,769,248 B1 | 9/2017 | Krishnan et al. |
| 9,794,188 B2 | 10/2017 | Baumback et al. |
| 9,825,831 B2 | 11/2017 | Baumback et al. |
| 9,996,501 B1 * | 6/2018 | Nelson ................... H03M 7/30 |
| 10,027,739 B1 | 7/2018 | Krishnan et al. |
| 10,104,009 B2 | 10/2018 | Baumback et al. |
| 10,148,542 B2 | 12/2018 | Baumback et al. |
| 10,205,644 B2 | 2/2019 | Baumback et al. |
| 10,225,365 B1 | 3/2019 | Hotchkies et al. |
| 10,284,446 B2 | 5/2019 | Baumback et al. |
| 10,311,371 B1 | 6/2019 | Hotchkies et al. |
| 10,311,372 B1 | 6/2019 | Hotchkies et al. |
| 10,410,085 B2 | 9/2019 | Bettis et al. |
| 10,462,025 B2 | 10/2019 | Baumback et al. |
| 2001/0034771 A1 | 10/2001 | Hutsch et al. |
| 2002/0016802 A1 | 2/2002 | Hodgkinson |
| 2002/0062372 A1 | 5/2002 | Hong et al. |
| 2002/0073235 A1 | 6/2002 | Chen et al. |
| 2002/0099829 A1 | 7/2002 | Richards et al. |
| 2002/0107913 A1 | 8/2002 | Rivera et al. |
| 2002/0112049 A1 | 8/2002 | Elnozahy et al. |
| 2002/0116491 A1 | 8/2002 | Boyd et al. |
| 2002/0120666 A1 | 8/2002 | Landsman et al. |
| 2002/0135611 A1 | 9/2002 | Deosaran et al. |
| 2002/0138443 A1 | 9/2002 | Schran et al. |
| 2002/0150276 A1 | 10/2002 | Chang |
| 2002/0156884 A1 | 10/2002 | Bertram et al. |
| 2002/0161911 A1 | 10/2002 | Pinckney, III et al. |
| 2002/0165912 A1 | 11/2002 | Wenocur et al. |
| 2002/0194382 A1 | 12/2002 | Kausik et al. |
| 2002/0198963 A1 | 12/2002 | Wu et al. |
| 2003/0005111 A1 | 1/2003 | Allan |
| 2003/0009488 A1 | 1/2003 | Hart, III |
| 2003/0037108 A1 | 2/2003 | Peiffer et al. |
| 2003/0065784 A1 | 4/2003 | Herrod |
| 2003/0118249 A1 | 6/2003 | Edgar |
| 2003/0128233 A1 | 7/2003 | Kasriel |
| 2003/0130982 A1 | 7/2003 | Kasriel |
| 2003/0131106 A1 | 7/2003 | Kasriel |
| 2003/0182305 A1 | 9/2003 | Balva et al. |
| 2003/0182413 A1 | 9/2003 | Allen et al. |
| 2003/0217144 A1 | 11/2003 | Fu et al. |
| 2003/0221000 A1 | 11/2003 | Cherkasova et al. |
| 2003/0236836 A1 | 12/2003 | Borthwick |
| 2004/0039794 A1 | 2/2004 | Biby et al. |
| 2004/0039820 A1 | 2/2004 | Colby et al. |
| 2004/0049541 A1 | 3/2004 | Swahn |
| 2004/0049579 A1 | 3/2004 | Ims et al. |
| 2004/0059796 A1 | 3/2004 | McLintock |
| 2004/0064293 A1 | 4/2004 | Hamilton et al. |
| 2004/0064558 A1 | 4/2004 | Miyake |
| 2004/0128538 A1 | 7/2004 | Gmuender et al. |
| 2004/0194085 A1 | 9/2004 | Beaubien et al. |
| 2004/0199603 A1 | 10/2004 | Tafla et al. |
| 2004/0201669 A1 | 10/2004 | Guha et al. |
| 2004/0221034 A1 | 11/2004 | Kausik et al. |
| 2005/0021862 A1 | 1/2005 | Schroeder et al. |
| 2005/0055420 A1 | 3/2005 | Wyler |
| 2005/0076111 A1 | 4/2005 | Cherkasova et al. |
| 2005/0076339 A1 | 4/2005 | Merril et al. |
| 2005/0086645 A1 | 4/2005 | Diao et al. |
| 2005/0091612 A1 | 4/2005 | Stabb et al. |
| 2005/0102683 A1 | 5/2005 | Branson et al. |
| 2005/0182826 A1 | 8/2005 | Knittel et al. |
| 2005/0198571 A1 | 9/2005 | Kramer et al. |

(56) References Cited

U.S. PATENT DOCUMENTS

| | | |
|---|---|---|
| 2005/0223091 A1 | 10/2005 | Zahavi et al. |
| 2005/0223092 A1 | 10/2005 | Sapiro et al. |
| 2005/0229119 A1 | 10/2005 | Torvinen |
| 2005/0273507 A1 | 12/2005 | Yan et al. |
| 2006/0015865 A1 | 1/2006 | Schneider et al. |
| 2006/0020714 A1 | 1/2006 | Girouard et al. |
| 2006/0026275 A1 | 2/2006 | Gilmour et al. |
| 2006/0048071 A1 | 3/2006 | Jarrett et al. |
| 2006/0059246 A1 | 3/2006 | Grove |
| 2006/0069808 A1 | 3/2006 | Mitchell et al. |
| 2006/0085536 A1 | 4/2006 | Meyer et al. |
| 2006/0179080 A1 | 8/2006 | Meek et al. |
| 2006/0209701 A1 | 9/2006 | Zhang et al. |
| 2006/0218304 A1 | 9/2006 | Mukherjee et al. |
| 2006/0235961 A1 | 10/2006 | Klein et al. |
| 2006/0251339 A1 | 11/2006 | Gokturk et al. |
| 2006/0265497 A1 | 11/2006 | Ohata et al. |
| 2006/0282758 A1 | 12/2006 | Simons et al. |
| 2007/0016736 A1 | 1/2007 | Takeda et al. |
| 2007/0021998 A1 | 1/2007 | Laithwaite et al. |
| 2007/0050703 A1 | 3/2007 | Lebel |
| 2007/0088805 A1 | 4/2007 | Cyster |
| 2007/0094325 A1 | 4/2007 | Ih et al. |
| 2007/0118640 A1 | 5/2007 | Subramanian et al. |
| 2007/0136469 A1 | 6/2007 | Nusbickel |
| 2007/0143672 A1 | 6/2007 | Lipton et al. |
| 2007/0198982 A1 | 8/2007 | Bolan et al. |
| 2007/0214454 A1 | 9/2007 | Edwards et al. |
| 2007/0219795 A1 | 9/2007 | Park et al. |
| 2007/0226058 A1 | 9/2007 | Lorenzen et al. |
| 2007/0239610 A1 | 10/2007 | Lemelson |
| 2007/0245010 A1 | 10/2007 | Arn et al. |
| 2007/0245299 A1 | 10/2007 | Sung et al. |
| 2007/0250560 A1 | 10/2007 | Wein et al. |
| 2007/0250611 A1 | 10/2007 | Bhogal et al. |
| 2007/0266151 A1 | 11/2007 | Friedland et al. |
| 2007/0271375 A1 | 11/2007 | Hwang |
| 2007/0299869 A1 | 12/2007 | Clary et al. |
| 2007/0299965 A1 | 12/2007 | Nieh et al. |
| 2007/0300152 A1 | 12/2007 | Baugher |
| 2008/0037432 A1 | 2/2008 | Cohen et al. |
| 2008/0050021 A1 | 2/2008 | Plant |
| 2008/0065724 A1 | 3/2008 | Seed et al. |
| 2008/0065745 A1 | 3/2008 | Leighton et al. |
| 2008/0086559 A1 | 4/2008 | Davis et al. |
| 2008/0098310 A1 | 4/2008 | Choi |
| 2008/0104502 A1 | 5/2008 | Olston |
| 2008/0114875 A1 | 5/2008 | Anastas et al. |
| 2008/0172488 A1 | 7/2008 | Jawahar et al. |
| 2008/0183672 A1 | 7/2008 | Canon et al. |
| 2008/0183721 A1 | 7/2008 | Bhogal et al. |
| 2008/0208961 A1 | 8/2008 | Kim et al. |
| 2008/0215583 A1 | 9/2008 | Gunawardena et al. |
| 2008/0215755 A1 | 9/2008 | Farber et al. |
| 2008/0228574 A1 | 9/2008 | Stewart et al. |
| 2008/0250327 A1 | 10/2008 | Li et al. |
| 2008/0289029 A1 | 11/2008 | Kim et al. |
| 2009/0037517 A1 | 2/2009 | Frei |
| 2009/0055542 A1 | 2/2009 | Zhao et al. |
| 2009/0063690 A1 | 3/2009 | Verthein et al. |
| 2009/0083228 A1 | 3/2009 | Shatz et al. |
| 2009/0083279 A1* | 3/2009 | Hasek ............... H04L 67/2823 |
| 2009/0089448 A1 | 4/2009 | Sze et al. |
| 2009/0119388 A1 | 5/2009 | Kikuchi et al. |
| 2009/0122714 A1 | 5/2009 | Kato |
| 2009/0187575 A1 | 7/2009 | DaCosta |
| 2009/0248786 A1 | 10/2009 | Richardson et al. |
| 2009/0248852 A1 | 10/2009 | Fuhrmann et al. |
| 2009/0248893 A1 | 10/2009 | Richardson et al. |
| 2009/0319636 A1 | 12/2009 | Tokumi |
| 2009/0327460 A1 | 12/2009 | Yoo et al. |
| 2009/0327517 A1 | 12/2009 | Sivasubramanian et al. |
| 2009/0327914 A1 | 12/2009 | Adar et al. |
| 2010/0005403 A1 | 1/2010 | Rozmaryn et al. |
| 2010/0034470 A1 | 2/2010 | Valencia-Campo et al. |
| 2010/0161792 A1* | 6/2010 | Palm ............... H04L 12/2812 709/224 |
| 2010/0195908 A1 | 8/2010 | Bechtel et al. |
| 2010/0211459 A1 | 8/2010 | Seeman et al. |
| 2010/0318508 A1 | 12/2010 | Brawer et al. |
| 2010/0325615 A1 | 12/2010 | Ramot |
| 2010/0332650 A1 | 12/2010 | Aisen et al. |
| 2011/0055627 A1 | 3/2011 | Zawacki et al. |
| 2011/0096987 A1 | 4/2011 | Morales et al. |
| 2011/0145715 A1 | 6/2011 | Malloy et al. |
| 2011/0264511 A1 | 10/2011 | Zhang |
| 2012/0042277 A1 | 2/2012 | Lin-Hendel |
| 2012/0164621 A1 | 6/2012 | Katz et al. |
| 2013/0007273 A1 | 1/2013 | Baumback et al. |
| 2013/0031040 A1 | 1/2013 | Modha |
| 2013/0091294 A1* | 4/2013 | El-Beltagy ........... H04L 67/1046 709/231 |
| 2013/0191450 A1* | 7/2013 | Bodenhamer ..... G06F 17/30899 709/203 |
| 2013/0198298 A1 | 8/2013 | Li et al. |
| 2014/0113600 A1 | 4/2014 | El Gamal et al. |
| 2014/0129707 A1 | 5/2014 | Baumback et al. |
| 2014/0135105 A1 | 5/2014 | Quan et al. |
| 2014/0143320 A1 | 5/2014 | Sivasubramanian et al. |
| 2014/0219279 A1 | 8/2014 | Gross et al. |
| 2014/0250051 A1 | 9/2014 | Lahav et al. |
| 2014/0257891 A1 | 9/2014 | Richardson et al. |
| 2014/0304406 A1 | 10/2014 | Baumback et al. |
| 2014/0317726 A1 | 10/2014 | Turgeman et al. |
| 2014/0372511 A1 | 12/2014 | Kapadia et al. |
| 2015/0012649 A1 | 1/2015 | Baumback et al. |
| 2015/0032801 A1 | 1/2015 | Hart |
| 2015/0088968 A1 | 3/2015 | Wei et al. |
| 2015/0156280 A1* | 6/2015 | Vaswani ............... H04L 67/42 709/203 |
| 2015/0220990 A1 | 8/2015 | Kobyakov et al. |
| 2015/0242379 A1 | 8/2015 | Kuivinen et al. |
| 2015/0263927 A1 | 9/2015 | Baumback et al. |
| 2015/0288593 A1 | 10/2015 | Campbell |
| 2015/0326491 A1 | 11/2015 | Baumback et al. |
| 2015/0333997 A1 | 11/2015 | Mermoud et al. |
| 2015/0358250 A1 | 12/2015 | Baumback et al. |
| 2016/0020972 A1 | 1/2016 | Baumback et al. |
| 2016/0057072 A1 | 2/2016 | Baumback et al. |
| 2016/0188181 A1 | 6/2016 | Smith |
| 2016/0267354 A1 | 9/2016 | Bettis et al. |
| 2017/0054621 A1 | 2/2017 | Baumback et al. |
| 2017/0070446 A1 | 3/2017 | Baumback et al. |
| 2017/0187591 A1 | 6/2017 | Baumback et al. |
| 2018/0054371 A1 | 2/2018 | Baumback et al. |
| 2019/0109926 A1 | 4/2019 | Hotchkies et al. |

OTHER PUBLICATIONS

McCulloch et al. "A Logical Calculus of the Ideas Immanent in Nervous Activity", Bulletin of Mathematical Biophysics, vol. 5, 1943, 19 pages.

Arcelli et al., "A New Technique for Image Magnification", p. 53-61, 2009.

Bennami, M., et al., Resource Allocation for Autonomic Data Centers Using Analytic Performance Models, 2005, IEEE, 12 pages.

Chang, F., et al., Automatic Configuration and Run-time Adaptation of Distributed Applications, 2000, IEEE, 10 pages.

Extended Search Report in European Application No. 16001480.9 dated Dec. 5, 2016.

Feldmeier, Improving Gateway Performance With a Routing-Table Cache, Massachusetts Institute of Technology, Laboratory for Computer Science, IEEE, Mar. 27, 1988, pp. 298-307.

Halpern, et al., Internet Draft, "Advertising Equal Cost Multipath routes in BGP; draft-bhatia-ecmp-routes-in-bgp-02.txt", The Internet Society 2006, 16 pages.

Kalogiros et al, "Understanding Incentives for Prefix Aggregation in BGP", Re-Architecting The Internet, ACM, Dec. 1, 2009, pp. 49-54.

Kounev, S., et al., Autonomic QoS-Aware Resource Management in Grid Computing Using Online Performance Models, 2007, ICST, Valuetools, 2007, 10 pages.

(56) References Cited

OTHER PUBLICATIONS

Ludwig, "Traffic engineering with BGP", Seminar "Internet Routing", Technical University Berlin, Jul. 2, 2009, pp. 1-10.
Schlansker et al, "Killer Fabrics for Scalable Datacenters", HP Technical Report, HPL-2009-26, 26 Feb. 26, 2009, 16 pages.

* cited by examiner

PERFORMANCE-BASED CONTENT DELIVERY

CROSS-REFERENCE TO RELATED APPLICATIONS

This application is a continuation of U.S. patent application Ser. No. 14/572,705, entitled "PERFORMANCE-BASED CONTENT DELIVERY," filed Dec. 16, 2014, and soon to issue as U.S. Pat. No. 9,769,248, which is hereby incorporated by reference herein in its entirety.

BACKGROUND

Generally described, computing devices and communication networks can be utilized to exchange information. In a common application, a computing device can request content from another computing device via the communication network. For example, a user at a personal computing device can utilize a software browser application to request a network resource, such as a Web page, from a server computing device via the Internet. In such embodiments, the user computing device can be referred to as a client computing device ("client") and the server computing device can be referred to as a content provider.

Content providers are generally motivated to provide requested content to client computing devices via efficient transmission of the content. Users are generally interested in receiving content or having content rendered promptly. However, user experience may vary when requested content is being delivered and rendered on client computing devices depending on the combination of networking, computing, or other resources associated with the client computing device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
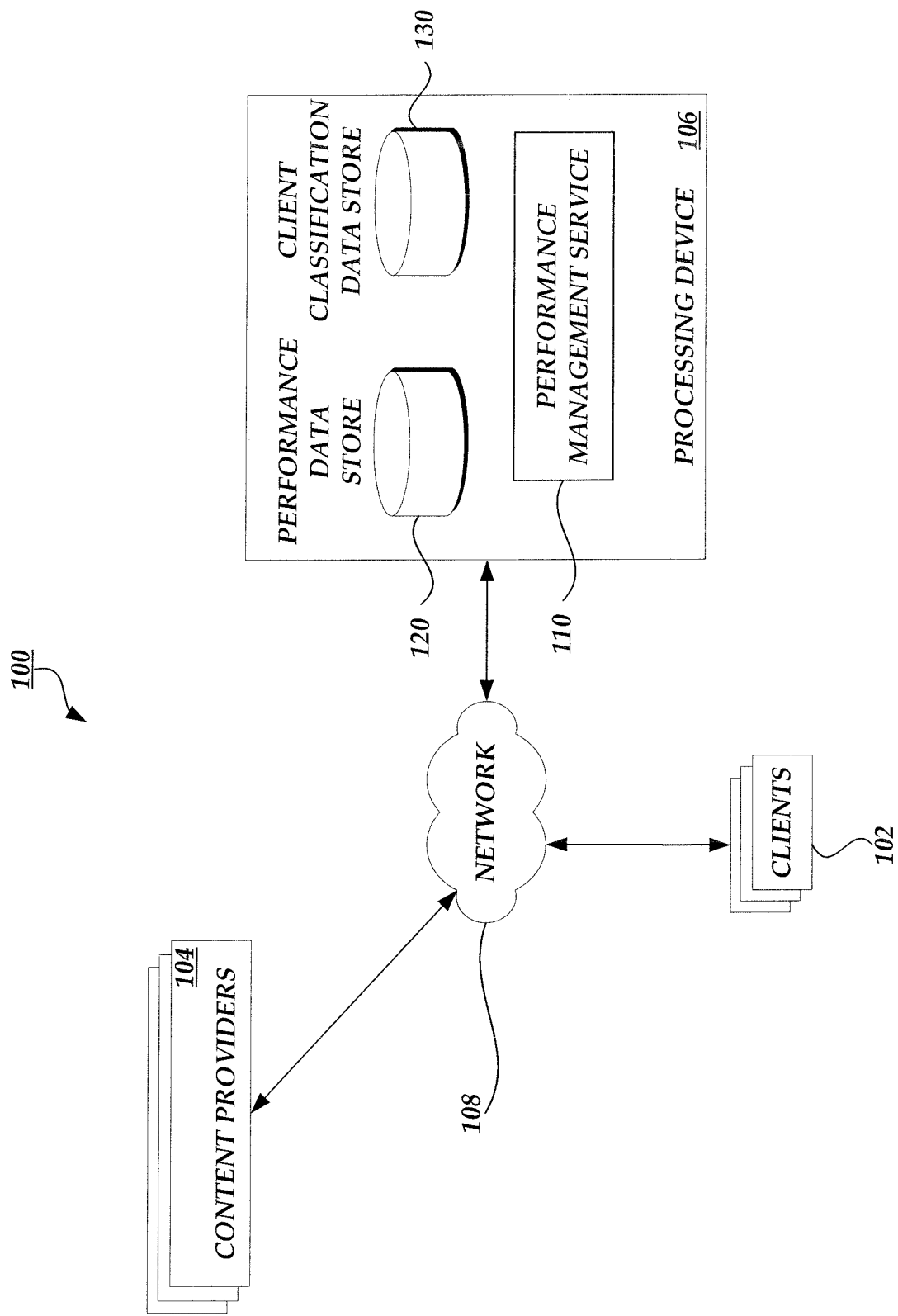
FIG. 1 is a block diagram illustrative of one embodiment of a content delivery system including a number of client computing devices, content providers, and a processing device including a performance management service.

Generally described, the present disclosure is directed to the management of content delivery in response to content requests from clients to network entities, such as content providers. Specifically, aspects of the disclosure will be described with regard to defining client performance categories based on performance data regarding requesting content, delivering content, and rendering content, thereby enabling content providers to generate or update content based on characteristics of different performance categories in order to improve user experience. The disclosure also relates to developing client classification criteria for predicting a current performance category for clients, so that when a client requests content from a content provider the client can be classified into a performance category in real time based on applicable client classification criteria. For example, the classification of the client can be performed simultaneously with the processing of a content request submitted by the client. The classification can be as instantaneously as possible upon receipt of data regarding the content request by a processing system, limited by the system's ability to receive, access, or transform the data. Illustratively, the classification of the client is completed before the content provider determines or generates a response to the content request. The predicted category of the client can be provided to the content provider making it possible for the content provider to transmit an appropriate version of the requested content to the client.

For example, client computing devices can collect performance data related to requesting content, delivering content, and rendering content, such as latency information associated with the initiation of a content request and receipt of resources responsive to the request. For example, client computing devices can measure a time associated with submitting a content request, requesting/retrieving resources associated with the content request, and rendering content corresponding to the request on the client computing device. Additionally, network servers associated with content providers can collect performance data, such as latency information associated with processing of a client request for a resource by a server. For example, network servers can measure a time associated with processing an incoming client request, identifying/obtaining the requested resource, and initiating the transmission of the resource responsive to the client request.

A performance management service may obtain and aggregate performance data from a number of clients or content providers, for example, over a specified period of time. The performance management service may analyze the performance data in various ways and define performance categories that each client may belong to. For example, the performance management service may analyze performance data corresponding to content requests from various clients to a specific content provider (e.g., by generating a histogram of a type or combination of latencies associated with each of the content requests), and determine that clients submitting the content requests can be classified into low, medium, or high latency categories each associated with a specified latency measurement range. The performance management service may further develop classification criteria for predicting whether or how likely a client may fall within a particular category when the client has submitted a particular type of content request, when actual performance of the client is not measured. The performance management service may provide the defining or characterizing information of the performance categories to the specific content provider so that the content provider may utilize the information to generate different versions of certain frequently accessed content, each version designed to optimize user experience of content delivery and rendering for a respective category of clients.

Subsequently, when a client submits a content request to the content provider, the performance management service may predict which performance category the client belongs to in connection with the content request. Illustratively, the client or the content provider may provide information regarding the instant content request submitted by the client to the performance management service. The performance management service may also obtain performance data specific to the client, such as latency data regarding most recent content requests submitted by the client. The performance management service may apply client classification criteria to the content request information and applicable client performance data and determine a performance category that the client may fall within. The performance management service may then provide the determined category information to the content provider. Accordingly, the content provider may then transmit to the client a version of requested content that corresponds to the determined category of the client.

Although various aspects of the disclosure will be described with regard to illustrative examples and embodiments, one skilled in the art will appreciate that the disclosed embodiments and examples should not be construed as limiting.

FIG. 1 is a block diagram illustrative of one embodiment of a content delivery system 100 including a number of client computing devices 102 (generally referred to as clients), content providers 104, and a processing device 106 including a performance management service 110. The clients 102 can correspond to a wide variety of computing devices including personal computing devices, laptop computing devices, hand-held computing devices, terminal computing devices, mobile devices, wireless devices, digital media players, microconsoles, home automation systems, various electronic devices and appliances and the like. In an illustrative embodiment, the clients 102 include necessary hardware and software components for establishing communications, directly or indirectly, with other components of the content delivery system 100 over a communication network 108, such as a wide area network or local area network. For example, the clients 102 may be equipped with networking equipment and browsers that facilitate communications via the Internet or an intranet. Additionally, one skilled in the relevant art will appreciate that clients 102 can be associated with various additional computing devices/components including, but not limited to, content and resource administrative components, DNS resolvers, scheduling devices/components, and the like.

The clients 102 may also include necessary hardware and software components for requesting content from network entities in the form of an originally requested resource that may include identifiers to two or more embedded resources that need to be requested. Further, the clients 102 may include or be associated with necessary hardware and software components, such as browser software applications, plugins, scripts, standalone performance measurement devices, etc., for obtaining performance data associated with the client request, such as network level performance data including, for example, timing of receipt of first and last network packets of data for fulfilling the original resource request and each embedded resource request. Additionally, in an illustrative embodiment, the performance data of a client 102 may be collected by a proxy application for managing browser application content requests to the network resource. In other embodiments, the clients 102 may be otherwise associated with an external proxy application or device, as well as any other additional software applications or software services, used in conjunction with requests for content.

With continued reference to FIG. 1, the content delivery system 100 can also include one or more content providers 104 in communication with the one or more clients 102 via the communication network 108. Individual content providers 104 illustrated in FIG. 1 may correspond to a logical association of one or more computing devices associated with a content provider. Specifically, the content provider 104 can include a web server component corresponding to one or more server computing devices for obtaining and processing requests for content (such as Web pages) from the clients 102 or other components of the content delivery system 100. The content providers 104 can further include or be associated with a performance measurement component for obtaining performance data, such as a time associated with processing an incoming client request, identifying/obtaining the requested resource, and initiating the transmission of the resource responsive to the client request. One skilled in the relevant art will appreciate that the content providers 104 can be associated with various additional computing resources, such additional computing devices for administration of content and resources, DNS name servers, and the like. Although the content delivery system 100 is illustrated in a client-server configuration, one skilled in the relevant art will appreciate that the content delivery system 100 may be implemented in a peer-to-peer configuration as well.

With yet further continued reference to FIG. 1, the content delivery system 100 may further include a processing device 106 for analyzing performance data related to the processing of client requests and for classifying clients based on criteria derived from the analysis of performance data. As illustrated in FIG. 1, the processing device 106 is in communication with the one or more clients 102 and the content providers 108 via communication network 108. In some embodiments, the processing device 106 may be associated with a content provider 104. In other embodiments, the processing device 106 may serve as a proxy device managing content requests and retrievals between clients 102 and content providers 104.

Additionally, as will be further described below, the processing device 106 may include a performance management service 110 for the collection, aggregation, and analysis of performance data from the clients 102 and/or content providers 104, or any other computing devices, as well as for classifying clients in connection with content requests submitted by the client. The processing device 106 may further include a performance data store 120 for storing the received performance data and a client classification data store 130 for storing client classification criteria and client category information. The data store 120 or 130 can generally include any repository, database, or information storage system embodied in non-transitory computer readable media such as a disk memory, flash memory, optical memory, and the like. Even further, the data store 120 or 130 can include network-based memories. It will be appreciated by one skilled in the art that the performance management service 110 and data stores 120 and 130 may correspond to multiple devices/components and/or may be distributed.

One skilled in the relevant art will also appreciate that the components and configurations provided in FIG. 1 are illustrative in nature. Accordingly, additional or alternative components and/or configurations, especially regarding additional components, systems, and subsystems for facilitating communications may be utilized.

Figure 2:
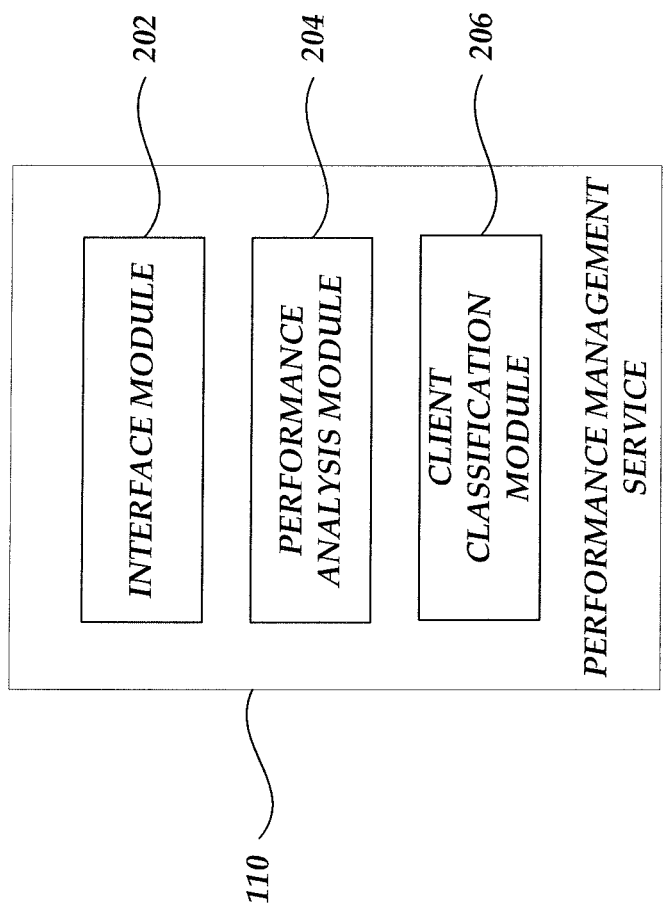
FIG. 2 is a block diagram illustrative of one embodiment of the performance management service.

FIG. 2 is a block diagram illustrative of one embodiment of the performance management service 110 implemented in accordance with the content delivery system 100 of FIG. 1. Illustratively, the performance management service 110 may include an interface module 202, a performance analysis module 204, and a client classification module 206, for carrying out various performance data analysis and client classification methods and processes described herein. The interface module 202 can communicate with clients 102 or content providers 104 in various ways. For example, the interface module 202 can obtain performance data or content request information from clients 102 or content providers 104. The interface module 202 may also transmit client category information to content providers 104. In some embodiments where the performance management service 110 serves as a proxy application between clients 102 and content providers 104, the interface module 202 can receive content requests from a client 102 and forward the request (possibly with a prediction of performance category associated with the client 102) to a content provider 104 and, in turn, can receive corresponding responses from the content provider 104 and forward them to the client 102.

Illustratively, the performance analysis module 204 can implement various computational, statistical, or machine learning methods to develop criteria for grouping or categorizing clients 102 based on performance data. The performance data analyzed by the performance analysis module 204 can be forwarded from the interface module 202, can be obtained from the performance data store 120, or can be obtained from any repository or storage system of the content delivery system 100 that maintains such information (e.g., network activity logs). Illustratively, the client classification module 206 can classify a client 102 into a performance category in connection with a content request currently submitted by the client 102. Specifically, the client classification module 206 can apply client classification criteria derived from the analysis of performance data to the current content request information and applicable performance data specific to the client 102 and predict whether or how likely that the client 102 currently falls within a certain performance category. The performance management service 110 may include additional or different modules or components, which may facilitate or implement various methods and processes described herein. Further, the modules or components may include additional components, systems, and subsystems for facilitating the methods and processes.

Figure 3:
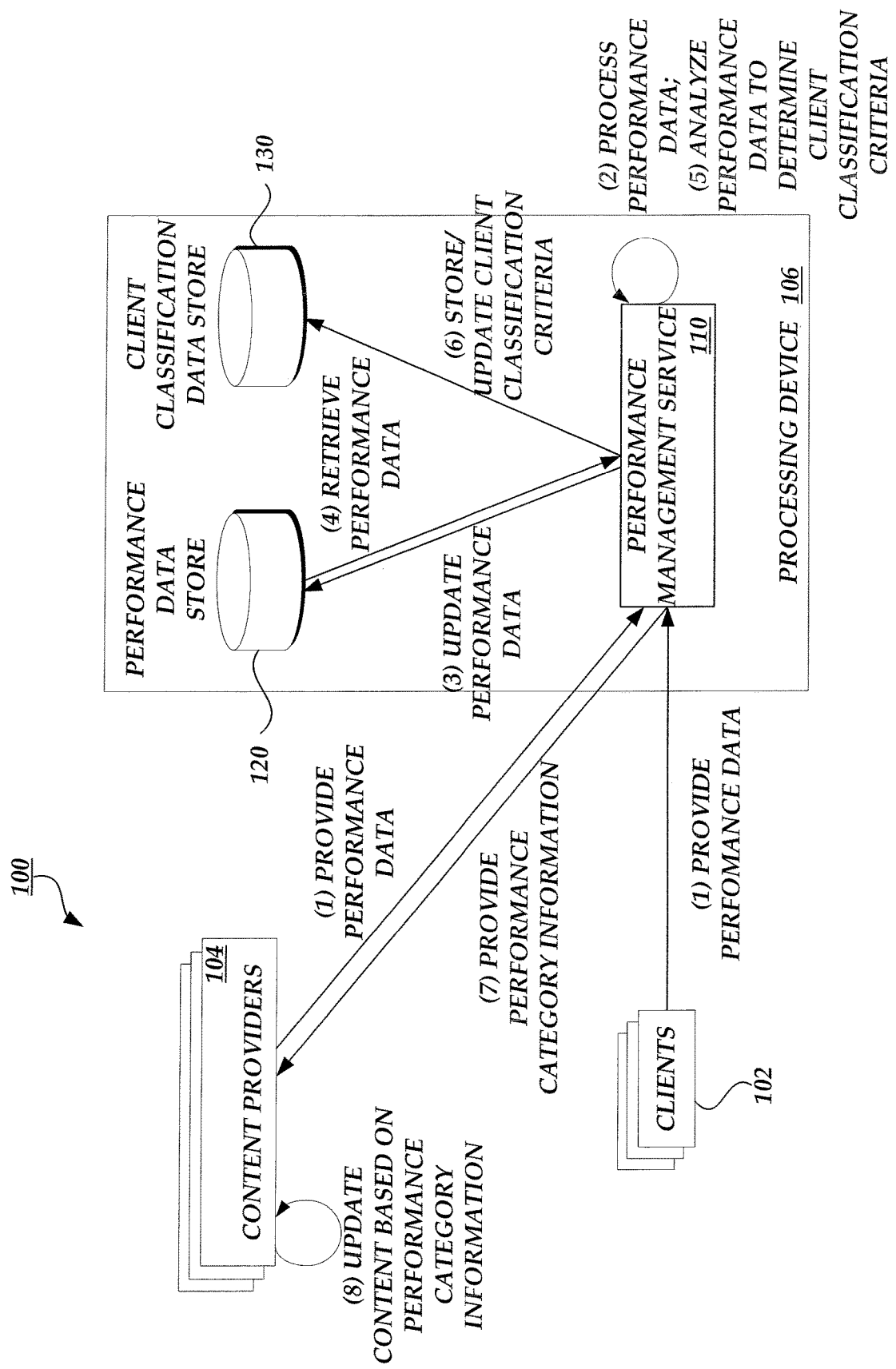
FIG. 3 is a simplified block diagram of the content delivery system of FIG. 1 illustrating the process of determining client classification criteria based on analysis of performance data and providing client category information to content providers.
Figure 4:
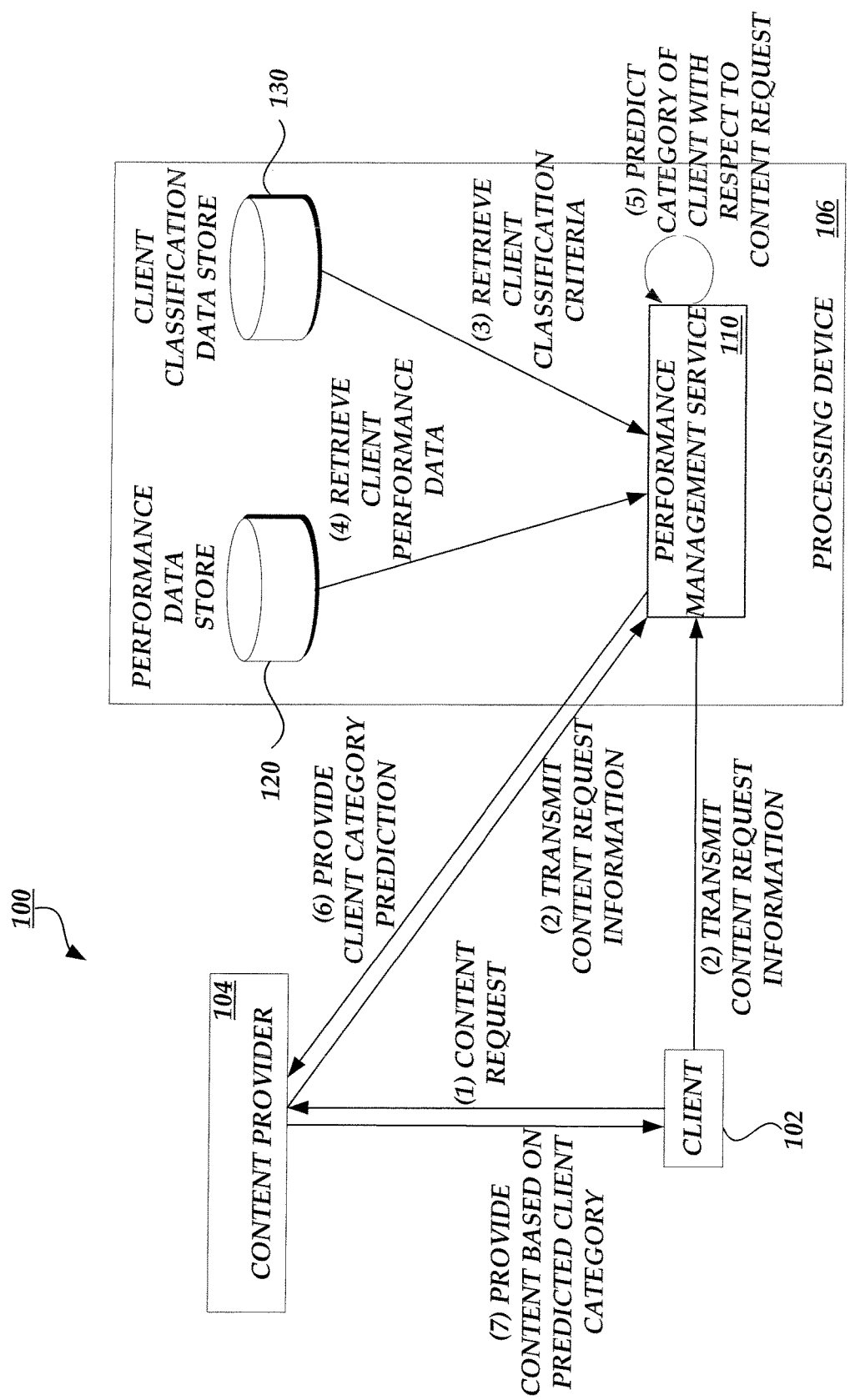
FIG. 4 is a simplified block diagram of the content delivery system of FIG. 1 illustrating the process of determining a performance category that a client may belong to in connection with a content request and enabling a content provider to provide category-based content to the client.

With reference now to FIGS. 3 and 4, the interactions among various components of the content delivery system 100 of FIG. 1 will be illustrated. For purposes of the examples, however, the illustrations have been simplified such that many of the components utilized to facilitate communications are not shown. One skilled in the relevant art will appreciate that such components can be utilized and that additional interactions would accordingly occur without departing from the spirit and scope of the present disclosure. Additionally, although communications may be illustrated as direct communications between components, one skilled in the relevant art will appreciate that all the illustrative communications may occur directly between components or be facilitated via other components of the content delivery system 100.

FIG. 3 is a simplified block diagram of the content delivery system 100 of FIG. 1 illustrating the process of determining client classification criteria based on analysis of performance data and providing client category information to the content providers 104. With reference to FIG. 3, at (1), one or more clients 102 and/or one or more content providers 104 may provide performance data to the performance management service 110. The performance data may include a variety of information, such as process information, memory information, network data, resource data, client computing component information, including page setups, browser rendering information, state variables, and other types of information. In one specific example, the performance data may include information regarding a time at which a particular resource was rendered on a Web page, its location on the page, whether the resource was rendered on the device display, and the like. In another specific example, the performance data may include network statistics, latencies, bandwidths, and data arrival times, such as the timing of receipt of first and last packets of information for the requested resource and each embedded resource. In yet another specific example, the performance data can include timing information associated with processing executable resources, such as JavaScript, as well as additional information that can be used to indirectly determine processing times associated with the execution of the resource once the executable code has been obtained.

The performance data can also include basic resource information, such as an identification of the resource type, a link to a header associated with the requested resource, a size of a transmission responsive to the resource request, including a size of the header as well as a size of a payload corresponding to the actual requested resource, an identification of a domain from which the resource was requested, and the like. Further, the performance data can include underlying computer resource information, such as a resolution of the display of the client computing device 102, a version of the browser application software, an identification of any plugins associated with the browser application software, an identification of any updates to the operating system of the client 102, and the like. Even further, the performance data can include information regarding the location of the client 102 (such as an IP address), servers associated with the content provider 104, and the like. Still further, the performance data can include an identification of limitations and/or restrictions associated with processing resource requests using client computing device hardware and/or software. For example, the performance data can include identification of a threshold number (e.g., a maximum, a minimum, a range, and the like) of simultaneous connections to a domain. As another example, the performance data can include identification of an order associated with initiating embedded resource requests.

As will be appreciated by one skilled in the art, the clients 102 or content providers 104 can provide the performance data upon request from the performance management service 110, upon completion of processing of the requested resource, or based on a predetermined condition or time interval.

At (2), the performance management service 110 may process received performance data. For example, the performance management service 110 may convert performance data into a standardized format, filter out information that are irrelevant to or not supported by certain data analysis methods employed by the performance management service 110, or aggregate the performance data based on various attributes (e.g., client identifier, content provider identifier, type of request, etc.) that describe the performance data. At (3), the performance management service 110 stores the performance data at the performance data store 120, for example, by updating any performance data currently maintained by the performance data store 120 with the newly received and processed performance data. As will be appreciated by one skilled in the relevant art, the updating of performance data can be performed by the performance management service 110 upon receiving new performance data or based on a predetermined condition or time interval.

At (4), the performance management service 110 retrieves performance data from the performance data store 120 to perform analysis thereon. The retrieved performance data may include performance data previously stored into the performance data store 120 by the performance management service 110 or another service or device. In some embodiments, the performance management service 110 may retrieve performance data based on predetermined criteria. For example, only data related to a group of content providers and concerning content requests/retrieval during a specified period of time are retrieved. In addition, the retrieval can occur periodically or based on a predetermined condition (e.g., a certain percentage of performance data has been updated since a previous retrieval of data). At (5), the performance management service 110 analyzes the retrieved performance data to define performance categories that clients 102 may fall within and to determine classification criteria applicable to predict an association between clients 102 and performance categories. In some embodiments, the performance management service 110 may first analyze the performance data to define one or more performance categories. For example, the performance management service 110 may identify a total processing time (generally referred to as perceived latency) associated with historical requests submitted by various clients 102 to a content provider 104 or a group of content providers 104. Illustratively, when the request is for a Web page, the perceived latency may be a period of time between a client 102's submission of an original resource request for the Web page and the rendering of all resources (including embedded resources) in a portion of the Web page that is initially visible to a user of the client 102 without scrolling.

The performance management service 110 may determine, based on retrieved performance data, perceived latencies across clients 102 based on different types of content requests, such as requests for Web pages that include distinct combinations of embedded resources such as HTML, images, videos, CSS, Javascript, or the like. For example, the performance management service 110 may determine historical perceived latencies associated with content requests for a specified Web page consisting of a distinct combination of HTML, images, and CSS, which may be representative of a typical Web page provided by a content provider 104. In some embodiments, performance data regarding the specified Web page may not be sufficient (e.g., there has not been a large enough number of requests for the specified Web page to warrant a statistically sound analysis). In these embodiments, historical perceived latencies associated with content requests for another resource, such as another Web page similar enough to the specified Web page (e.g., a few images included in the two Web pages are different in content but similar in size) can be included in the analysis as well.

To define performance categories, the performance management service 110 may sort or order the clients 102 based on historical perceived latencies associated with the clients 102 as reflected by the retrieved performance data. In some embodiments, clients 102 are identified based on session information, such as a session id associated with browse sessions. Accordingly, a client involved in multiple sessions may be treated as multiple clients 102. In other embodiments, clients 102 may allow for tracing based on unique identifications, such as cookies, IP addresses, or MAC addresses. Illustratively, performance categories can be defined based on percentile information associated with the sorted list of clients: a fast client category corresponding to 10% of the clients with shortest perceived latencies, a slow client category corresponding to 50% of the clients with longest perceived latencies, and a medium client category corresponding to the remaining clients. The number of performance categories and their corresponding percentile thresholds can be manually, semi-manually, semi-automatically, or automatically determined. For example, statistical modeling based on peaks of perceived latency histograms can be employed to identify percentile thresholds corresponding to different performance categories.

In some embodiments, the performance management service 110 may analyze perceived latencies associated with content requests for a specific type of resource, such as a specified image, video, or script code. Similarly, in situations where there is insufficient performance data for analysis with respect to the specified resource, performance data associated with content requests for a sufficiently similarly resource can be included in the analysis. The performance management service 110 may similarly sort or order clients based on their corresponding perceived latencies and define client categories using percentile thresholds. As can be envisioned by one skilled in the art, the performance management service 110 may analyze performance data based on various attributes or their combination associated with content requests, and define performance categories based thereon.

Based on the determined definition of performance categories (e.g., the percentile cutoffs of a sorted list of clients), the performance management service 110 may determine one or more performance characteristics associated with each performance category. For example, by examining the performance data associated with clients who belong to a fast client category with respect to a typical Web page provided by the content provider 104, the performance management service 110 may determine that perceived latencies of this category are always or very likely (e.g., 90% of the time) smaller than a time threshold. Similarly, the performance management service 110 may also determine that perceived latencies of a slow client category are always or very likely to be larger than a time threshold. The determined performance characteristics can also include information such as a relative size of a category of clients, client device or browser information that are common to a category of clients, geographic information associated with a category of clients, as well as any other information that can be derived from the performance data regarding the category of clients. As will be explained in further detail below, the performance characteristics of various categories can be provided to relevant content providers 104 so that the content providers 104 may create or update different versions of a same content suitable for different category of clients.

The performance management service 110 may further analyze the performance data to determine criteria for predicting a performance category that the client 102 may belong to based on historical performance information, without applying the performance category definitions. The performance management service 110 may analyze historical performance data and determine which past information may be a good indicator for classifying clients with respect to their currently submitted content requests. For example, assume performance categories have been defined based on client requests for resource X, the performance management service 110 may identify historical perceived latencies associated with requests submitted by each client prior to a time when the client submitted the request for resource X. The performance management service 110 may then analyze the historical data to develop rules or criteria for predicting performance categories for clients in connection with their requests for resource X.

In some embodiments, the performance management service 110 may determine that the perceived latencies associated with a specific number of most recent content requests submitted by a client within a time threshold of the request for resource X are indicative of a category that the client belongs to for the request for resource X. For example, the analysis may result in a statistical association rule that if a client falls within correspondingly defined fast client categories with respect to the most recent 5 requests within 15 minutes of the client's subsequent request for resource X, then 85% of the time the client also falls within a fast client category defined with respect to the request for resource X. This rule can then be applied to any client currently submitting a request for resource X.

In other embodiments, the performance management service 110 may use historical performance data associated with requests for resources similar to X to classify clients with respect to their currently submitted request for resource X. For example, the analysis of the historical performance data may support a classification criterion that if an average perceived latency associated with the most recent 3 requests made by a client 102 for similar resources are larger than a time threshold, then the client 102 likely belongs to a slow client category with respect to its current request for resource X.

At (7), the performance management service 110 provides performance category information to content providers 104. The performance management service 110 may select performance categories based on their relevancy to a content provider 104 and transmit selected performance category definition and corresponding performance characteristics to the content provider 104. As described above, performance categories may be defined with respect to content requests directed to a specific content provider 104 or a specific group of content providers 104, accordingly, many performance categories may have nothing to do with another content provider 104. Further, certain performance categories may be more important than other categories to a specific content provider 104, for example, based on the size, geographic distribution, or other performance characteristics of the category. Accordingly, the performance management service 110 may transmit important category information and omit unimportant ones.

At (8), the content providers 104 may generate or update content based on received performance category information. For example, based on the differences among certain performance characteristics associated with fast, medium, or slow performance categories with respect to requests for a Web page, a content provider 104 may generate a lighter version of the Web page that will help reduce the perceived latency for the slow client category. For example, a lighter version of the Web page may include in-lining CSS instead of references to external CSS from a Content Delivery Network (CDN), images of lower resolution, simplified script code, etc. At the same time, the content provider 104 may decide that the current version of the Web page can be enhanced to better serve the fast client category. For example, an enhanced version of the Web page may include references to external CSS, additional or enhanced images, complicated script code, etc. Finally, the content provider 104 may decide to keep the current version of the Web page to serve the medium client category.

FIG. 4 is a simplified block diagram of the content delivery system of FIG. 1 illustrating the process of determining a performance category that a client 102 may belong to in connection with a content request and enabling a content provider 104 to provide category-based content to the client 102. With reference to FIG. 4, at (1), a client 102 transmits a request for content to a content provider 104. The request for content can be part of a browse session request sent by the client 102. Upon receipt of the request, at (2), the content provider 104 may transmit information regarding the content request to the performance management service 110 to facilitate a performance category determination by the performance management service 110. Alternatively or in addition, the client 102 may transmit information regarding the content request to the performance management service 110. The transmitted information may include the content request itself, type of resources (including embedded resources) requested, time stamp associated with the receipt or submission of the request, etc. In some embodiments where the performance management service 110 serves as a proxy application between the client 102 and the content provider 104, the transmission of information regarding content request may not be required because the performance management service 110 receives content requests from the client 102 directly.

At (3), the performance management service 110 retrieves applicable client classification criteria from the client classification data store 130 based on the content request. For example, the performance management service 110 may only retrieve client classification criteria derived from performance data related to the same or similar client requests, related to the content provider 104, or related to other content providers that are situated similarly to the content provider 104 in terms of network topology. As described earlier, the retrieved criteria may specify that the perceived latencies associated with a specific number of most recent content requests submitted by the client 102 within a time threshold of the current content request are indicative of a category that the client 102 currently belongs to. The retrieved criteria may also indicate that the client's average perceived latency associated with a specific number of most recent requests for similar resources can be used to predict a current category of client 102. As will be appreciated by one skilled in the relevant art, the retrieved client classification criteria may not be mutually exclusive and individual criteria may be associated with respective confidence levels, such as a probability that a predicated category of the client 102 matches a performance category that the client 102 actually belongs to.

At (4), the performance management service 110 retrieves performance data specific to the client 102 from the performance data store 120 so that applicable client classification criteria can be applied. For example, the perceived latencies or actual performance categories associated with a number of most recent content requests submitted by the client 102 can be retrieved as basis for determining a current category that the client 102 may belong to. In some embodiments, most recent performance data specific to the client 102 may also be obtained from the client 102 or the content provider 104. Further, the performance management service 110 may obtain performance data regarding other clients that are situated similarly to the client 102 to facilitate or enhance a determination of category for the client 102. For example, the client 102 may not have submitted content requests sufficiently recently to invoke any retrieved client classification criterion based purely on recent performance data of the client 102. In this case, performance data regarding clients with hardware or software similarly configured as the client 102 and served by an Internet Service Provider (ISP) that also serves the client 102 may be utilized as a substitute for the performance data specific to the client 102.

At (5), the performance management service 110 applies applicable client classification criteria to the information regarding the current content request, performance data specific to the client 102, and/or performance data related to similarly situated clients and determines a performance category that the client 102 may currently belong to with respect to the content request. One skilled in the relevant art will appreciate that different criteria may result in the same or different category determinations. Some determined categories may be more general or specific than others, and some determined categories may even conflict with one another. One skilled in the relevant art will also appreciate that a classified or predicted performance category of a client may not match an actual performance category that the client belongs to with respect to a current content request. The actual performance category, however, is unknown to the performance management service 110 until after the current content request has been fulfilled by a corresponding content provider 104 (e.g., performance data corresponding to the content request can then be obtained and the actual performance category can be determined based on category definitions.)

At (6), the performance management service 110 provides performance category prediction information to the content provider 104. In some embodiments, the performance management service 110 may select and transmit one or more determined categories based, for example, on confidence levels associated with the determinations in accordance with their respective client classification criterion. In some embodiments, the performance management service 110 may transmit all of the predicted categories along with their associated confidence levels to the content provider 104. At (7), the content provider 104 receives the one or more determined client categories with respect to the content request and provides appropriate content to the client 102 accordingly. For example, the content provider 104 may identify a version of currently requested content to serve a determined category with the highest confidence level and provide the version of content to the client 102. As another example, the content provider may identify a version of currently requested content that corresponds to a most general or specific performance category as predicted and provide the version to the client 102.

Figure 5:
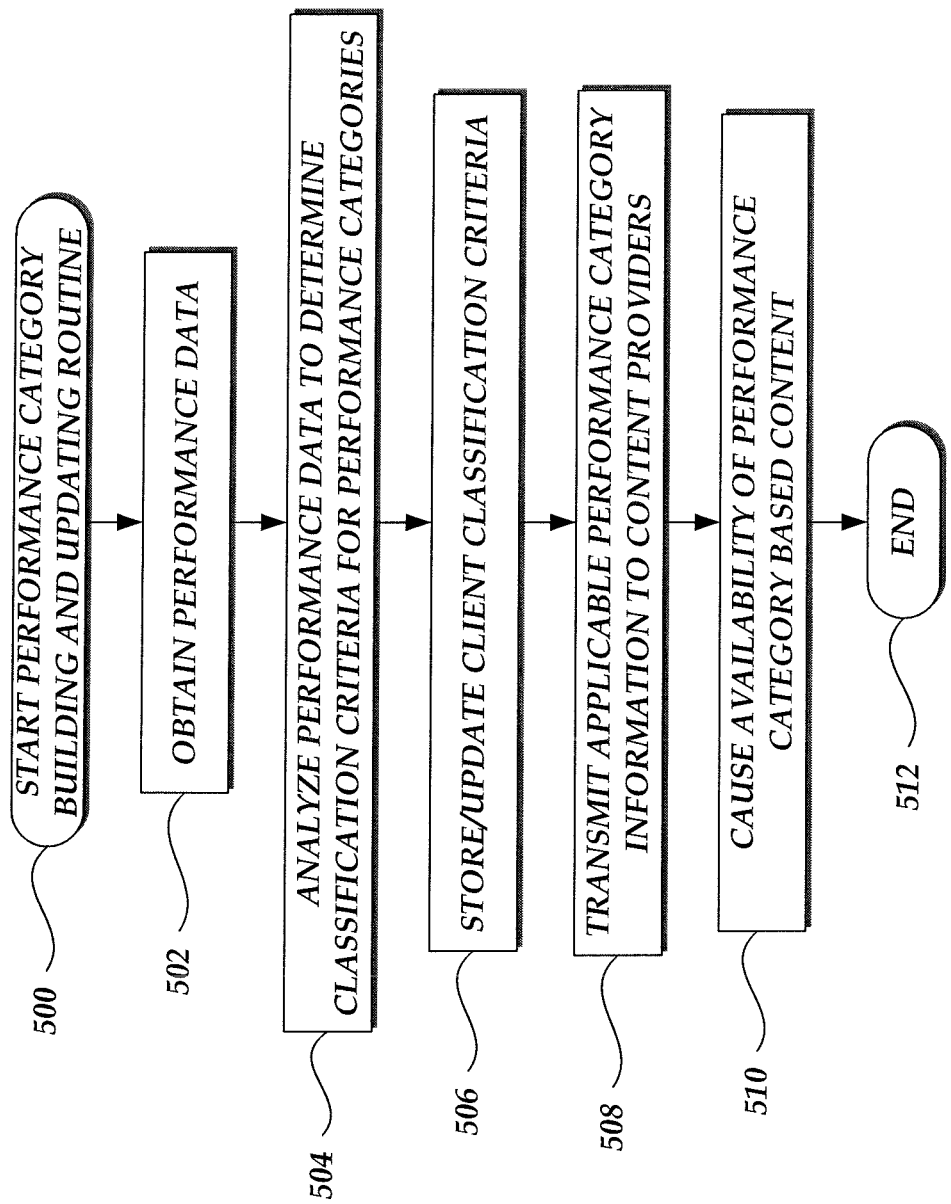
FIG. 5 is a flowchart illustrative of a performance category building or updating routine implemented by the performance management service.

FIG. 5 is a flowchart illustrative of a performance category building or updating routine implemented by the performance management service 110. The routine starts at block 500. At block 502, the performance management service 110 obtains performance data regarding content requesting, delivery, and rendering in connection with clients 102 or content providers 104. As described above, the performance data may include a variety of information, such as process information, memory information, network data, resource data, client computing component information, including page setups, browser rendering information, state variables, and other types of information. The performance data can also include basic resource information, such as an identification of the resource type, a link to a header associated with the requested resource, a size of a transmission responsive to the resource request, including a size of the header as well as a size of a payload corresponding to the actual requested resource, an identification of a domain from which the resource was requested, and the like. Further, the performance data can include underlying computer resource information, information regarding the location of a client 102 (such as an IP address), servers associated with a content provider 104, and the like. Still further, the performance data can include an identification of limitations and/or restrictions associated with processing resource requests using client computing device hardware and/or software. As will be appreciated by one skilled in the art, the clients 102 or content providers 104 can provide the performance data to the performance management service 110 upon request, upon completion of processing of the requested resource, or based on a predetermined condition or time interval.

At block 504, the performance management service 110 analyzes performance data to determine classification criteria for performance categories. In some embodiments, the performance management service 110 may first analyze the performance data to define one or more performance categories. For example, the performance management service 110 may identify perceived latencies associated with client requests for same or similar content (e.g., similar HTML, images, videos, CSS, Javascript, or their combination) but submitted by various clients 102 to various content providers 104. The performance management service 110 may sort or order the clients 102 based on their associated perceived latencies and define performance categories. For example, performance categories can be defined based on percentile information associated with the sorted list of clients, based on threshold values of perceived latencies, etc.

In some embodiments, the performance management service 110 may analyze performance data with respect to a particular content provider 104, such as perceived latencies associated with content requests received by the content provider 104. Also, in situations where there is insufficient performance data for analysis with respect to the particular content provider 104, performance data related to similar content providers can be included in the analysis. For example, content providers 104 may be considered similar if their services are hosted by a same hosting environment, reside in similar locations based on network topology, and/or are equipped with similar computational or networking resources.

Based on the determined definition of performance categories (e.g., the percentile cutoffs of a sorted list of clients), the performance management service 110 may determine one or more performance characteristics associated with each performance category. For example, by examining the performance data associated with clients who belong to a fast client category with respect to a typical Web page provided by the content provider 104, the performance management service 110 may determine that perceived latencies of this category are always or very likely (e.g., 90% of the time) smaller than a time threshold. Similarly, the performance management service 110 may also determine that perceived latencies of a slow client category are always or very likely to be larger than a time threshold. The determined performance characteristics can also include information such as a relative size of a category of clients, client device or browser information that are common to a category of clients, geographic distribution associated with a category of clients, as well as any other information that can be derived from the performance data regarding the performance categories.

The performance management service 110 may further analyze the performance data to determine one or more criteria for predicting a category that a client 102 may currently belong to. The performance management service 110 may analyze historical performance data and determine which past information may be a good indicator for classifying clients with respect to their currently submitted content requests. For example, assume performance categories have been defined based on client requests for resource X, the performance management service 110 may identify historical perceived latencies associated with requests submitted by each client prior to a time when the client submitted the request for resource X. The performance management service 110 may then analyze the historical data to develop rules or criteria for predicting performance categories for clients in connection with their requests for resource X. As another example, the performance management service 110 may use historical performance data associated with requests for resources similar to X to classify clients with respect to their currently submitted request for resource X.

At block 508, the performance management service 110 provides performance category information to content providers 104. The performance management service 110 may select client categories based on their relevancy to a content provider 104 and transmit selected performance category definition and corresponding performance characteristics to the content provider 104. As described earlier, performance categories may be defined with respect to content requests directed to a specific content provider 104 or a specific group of content providers 104. Accordingly, many performance categories defined by the performance management service 110 may have nothing to do with another content provider 104. Further, certain categories of clients may be more important than other categories to a specific content provider 104, for example, based on the size, geographic distribution, or other performance characteristics of the category. Accordingly, the performance management service 110 may transmit important category information and omit unimportant ones.

At block 510, the performance management service 110 may cause content providers 104 to generate or update content based on performance category information. For example, based on the differences among certain performance characteristics associated with fast, medium, or slow client categories with respect to requests for a Web page, a content provider 104 may generate a lighter version of the Web page that will help reduce perceived latencies for the slow client category. Illustratively, a lighter version of the Web page may include in-lining CSS instead of references to external CSS from a Content Delivery Network (CDN), images of lower resolution, simplified script code, etc. At the same time, the content provider 104 may decide that the current version of the Web page can be enhanced to better serve the fast client category. For example, an enhanced version of the Web page may include references to external CSS, additional or enhanced images, complicated script code, etc. Finally, the content provider 104 may decide to keep the current version of the Web page to serve the medium client category. The routine of FIG. 5 ends at block 512.

Figure 6:
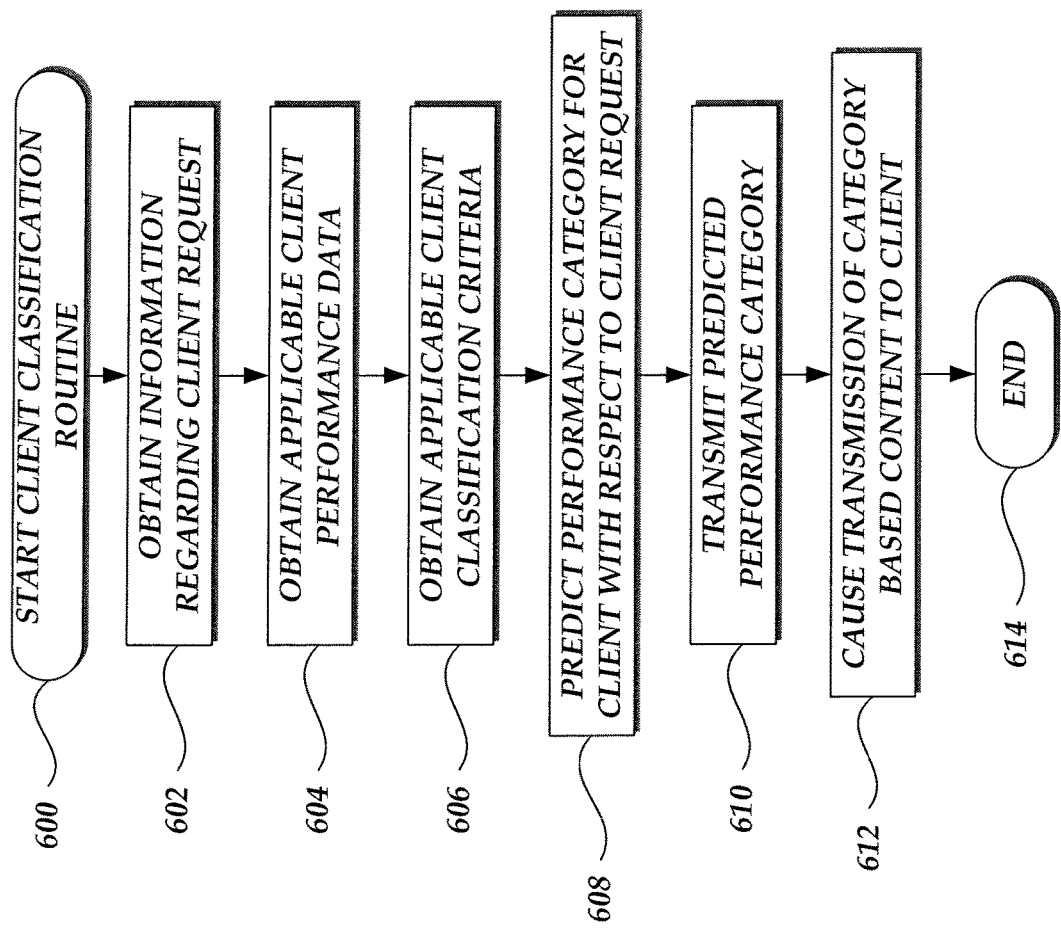
FIG. 6 is a flowchart illustrative of a client classification routine implemented by the performance management service.

FIG. 6 is a flowchart illustrative of a client classification routine implemented by the performance management service 110. The routine starts at block 600. At block 602, the performance management service 110 obtains information about a content request submitted by a client 102. The information may include the content request itself, the requesting client 102, a receiving content provider 104, type of resources (including embedded resources) requested, time stamp associated with the receipt or submission of the request, etc. In some embodiments where the performance management service 110 serves as a proxy application between the client 102 and the content provider 104, the transmission of information regarding content request may not be required because the performance management service 110 receives content requests from the client 102 directly.

At block 604, the performance management service 110 obtains client performance data that facilitates prediction of a performance category that the client 102 may currently belong to. For example, the performance management service 110 may only obtain performance data specific to the client 102, such as perceived latencies associated with a number of most recent content requests submitted by the client 102. As another example, actual performance categories associated with the client 102 with respect to a number of most recent content requests can be retrieved as well. The obtained performance data may serve as basis for determining a category that the client 102 possibly falls within with respect to the currently submitted request. Also, the performance management service 110 may obtain performance data regarding other clients that are situated similarly to the client 102 to facilitate or enhance a determination of category for the client 102. For example, the client 102 may not have submitted content requests recently (e.g., within 20 minutes of the currently submitted content request). In this case, performance data regarding clients with hardware or software similarly configured as the client 102 and served by an Internet Service Provider (ISP) that also serves the client 102 may be utilized as a substitute for the performance data specific to the client 102.

At block 606, the performance management service 110 obtains applicable client classification criteria for predicting a performance category that the client 102 may currently belong to in connection with the submitted content request. In some embodiments, the performance management service 110 may only retrieve client classification criteria derived from performance data related to same or similar client requests, related to the receiving content provider 104, or related to other content providers that are situated similarly to the content provider 104 in terms of network topology. As described above, the retrieved criteria may specify that the perceived latencies associated with a specific number of most recent content requests submitted by the client 102 within a time threshold of the current content request are indicative of a category that the client 102 currently belongs to. The retrieved criteria may also indicate that the client's average perceived latency associated with a specific number of most recent requests for similar resources can be used to predict a current category of client 102. As will be appreciated by one skilled in the art, the retrieved client classification criteria may not be mutually exclusive and individual criterion may be associated with a respective confidence level, such as a probability that a predicted category of the client 102 matches a performance category that the client 102 actually belongs to.

At block 608, the performance management service 110 applies applicable client classification criteria to the information regarding the current content request, performance data specific to the client 102, and/or performance data related to similarly situated clients and determines a category that the client 102 may currently belong to in connection with the content request. One skilled in the art will appreciate that different criteria may result in same or different category determinations. Some determined categories may be more general or specific than others, and some determined categories may even conflict with one another. One skilled in the art will also appreciate that a classified or predicted performance category of a client may not match an actual performance category that the client belongs to with respect to the current content request. The actual performance category, however, is unknown to the performance management service 110 until after the current content request has been fulfilled by a corresponding content provider 104 (e.g., performance data corresponding to the content request can then be obtained and the actual performance category can be determined based on category definitions.) In some embodiments, the performance management service 110 may also predict a performance category based on other factors, such as network outage or anomaly on a route between the client 102 and the content provider 104.

At block 610, the performance management service 110 transmits client category prediction information to the content provider 104. In some embodiments, the performance management service 110 may select and transmit one or more predicted categories based, for example, on confidence levels associated with the predictions. In some embodiments, the performance management service 110 may transmit all of the determined categories along with their associated confidence levels to the content provider 104. At block 612, the performance management service 110 causes the content provider 104 to provide appropriate content to the client 102 based on the determined client category information. For example, the performance management service 110 may cause the content provider 104 to transmit to the client 102 a version of content corresponding to a determined category with the highest confidence level to the client 102. As another example, the performance management service 110 may cause the content provider 104 to identify a version of currently requested content that corresponds to a most general or specific category as determined for the client 102 and provide the version to the client 102. The routine of FIG. 6 ends at block 614.

Embodiments of the disclosure can be described in view of the following clauses:

Clause 1: A computer-implemented method for facilitating content delivery based on performance categories, the computer-implemented method comprising:
  under control of a hardware computing device configured with specific computer executable instructions,
    obtaining performance data from a plurality of client computing devices, wherein the performance data includes latency information regarding processing of requests for network resources by individual client computing devices of the plurality of client computing devices over a specified period of time;
    determining at least one criterion for defining a plurality of performance categories based, at least in part, on an analysis of the performance data;
    determining at least one performance characteristic of a subset of the plurality of client computing devices that correspond to at least one performance category of the plurality of performance categories in accordance with the at least one criterion;
    transmitting the at least one performance characteristic to a provider of network resources;
    causing generation of at least one version of a target network resource by the provider based, at least in part, on the at least one performance characteristic;
    transmitting to the provider a prediction that associates a client computing device with the at least one performance category, wherein the client computing device transmitted a request to the provider for the target network resource; and
    causing transmission of the at least one version of the target network resource, by the provider, to the client computing device in response to the request for the target network resource based, at least in part, on the prediction.

Clause 2: The computer-implemented method of Clause 1, wherein the performance data corresponds to requests for one or more types of network resource over the specified period of time.

Clause 3: The computer-implemented method of Clauses 1 and 2, wherein the analysis of the performance data comprises generating a sorted list of the plurality of client computing devices based, at least in part, on the latency information.

Clause 4: The computer-implemented method of Clause 3, wherein determining the at least one performance characteristic comprises determining at least one percentile associated with the sorted list of client computing devices.

Clause 5: The computer-implemented method of Clauses 1 to 4, wherein the at least one performance characteristic corresponds to an aggregate statistic of latencies perceived by individual user associated with a respective client computing device of the subset of client computing devices for processing one or more network resources.

Clause 6: A computer-implemented method comprising:
  under control of a hardware computing device configured with specific computer executable instructions,
    defining a plurality of performance categories based, at least in part, on an analysis of performance data associated with requests for network resources by a plurality of client computing devices, individual performance category of the plurality of performance categories corresponds to a subset of client computing devices of the plurality of client computing devices;
    determining at least one performance characteristic corresponding to a target performance category of the plurality of performance categories;
    causing generation of at least one version of a target network resource based, at least in part, on the at least one performance characteristic;
    generating a prediction that associates a client computing device with the target performance category; and
    causing transmission of the at least one version of the target network resource to the client computing device in response to a request for the target network resource.

Clause 7: The computer-implemented method of Clause 6 further comprising obtaining the performance data from at least one of the plurality of client computing devices or at least one computing device associated with a content provider that fulfills the requests for network resources.

Clause 8: The computer-implemented method of Clauses 6 and 7, wherein defining the plurality of performance categories comprises defining the plurality of performance categories based, at least in part, on analysis of performance data associated with requests for similar network resources.

Clause 9: The computer-implemented method of Clauses 6 to 8, wherein defining the plurality of performance categories comprises defining the plurality of performance categories based, at least in part, on analysis of performance data associated with requests for network resources to similar content providers.

Clause 10: The computer-implemented method of Clauses 6 to 9, wherein causing generation of the at least one version of the target network resource comprises determining whether to include in-lining Cascading Style Sheets (CSS) or external CSS in the at least one version of the target network resource based, at least in part, on the at least one performance characteristic.

Clause 11: A system comprising:
a data store configured to at least store computer-executable instructions; and
a hardware processor in communication with the data store, the hardware processor configured to execute the computer-executable instructions to at least:
define a plurality of performance categories based, at least in part, on an analysis of performance data associated with requests for network resources by a plurality of client computing devices, individual performance category of the plurality of performance categories corresponds to a subset of client computing devices of the plurality of client computing devices;
determine at least one performance characteristic corresponding to a target performance category of the plurality of performance categories;
cause generation of at least one version of a target network resource based, at least in part, on the at least one performance characteristic;
generate a prediction that associates a client computing device with the target performance category; and
cause transmission of the at least one version of the target network resource to the client computing device in response to a request for the target network resource.

Clause 12: The system of Clause 11, wherein the performance data comprises at least one of process information, memory information, network data, resource data, or client computing component information.

Clause 13: The system of Clauses 11 and 12, wherein the analysis of the performance data comprises generating a sorted list of the plurality of client computing devices based, at least in part, on performance data associated with requests for similar network resources.

Clause 14: The system of Clause 13, wherein defining the plurality of performance categories is based, at least in part, on a partition of the sorted list of the client computing devices.

Clause 15: The system of Clauses 11 to 14, wherein the at least one performance characteristic corresponding to the target performance category includes at least one of latency information, size information, device information, or geographic information that are associated with a subset of client computing devices corresponding to the target performance category.

Clause 16: A non-transitory computer readable storage medium storing computer executable instructions that when executed by a processor perform operations comprising:
defining a plurality of performance categories based, at least in part, on an analysis of performance data associated with requests for network resources by a plurality of client computing devices, individual performance category of the plurality of performance categories corresponds to a subset of client computing devices of the plurality of client computing devices;
determining at least one performance characteristic corresponding to a target performance category of the plurality of performance categories;
causing generation of at least one version of a target network resource based, at least in part, on the at least one performance characteristic;
generating a prediction that associates a client computing device with the target performance category; and
causing transmission of the at least one version of the target network resource to the client computing device in response to a request for the target network resource.

Clause 17: The non-transitory computer-readable storage medium of Clause 16, wherein the target performance category is defined based, at least in part, on an analysis of performance data associated with requests for the target network resource during a specified period of time.

Clause 18: The non-transitory computer-readable storage medium of Clause 17, wherein the target performance category corresponds to one of a fast, medium, or slow performance category with respect to delivery of the target network resource to the plurality of client computing devices during the specified period of time.

Clause 19: The non-transitory computer-readable storage medium of Clauses 16 to 18, wherein causing generation of the at least one version of a target network resource includes causing generation of a first version of the target network resource, wherein the first version includes at least one of an in-lining Cascading Style Sheet (CSS), image of lower resolution, or simplified script code that corresponds to the target network resource.

Clause 20: The non-transitory computer-readable storage medium of Clauses 16 to 19, wherein causing generation of the at least one version of a target network resource includes causing generation of a second version of the target network resource, wherein the second version includes at least one of a reference to external Cascading Style Sheet (CSS), additional or enhanced image, or complicated script code that corresponds to the target network resource.

Clause 21: A computer-implemented method for facilitating content delivery based on performance categories, the computer-implemented method comprising:
under control of a hardware computing device configured with specific computer executable instructions,
obtaining performance data from a plurality of client computing devices, wherein the performance data includes latency information regarding processing of requests for network resources by individual client computing devices of the plurality of client computing devices over a specified period of time;
obtaining definitions of a plurality of performance categories for the plurality of client computing devices;
determining at least one criterion for associating a target performance category of the plurality of performance categories with a target client computing device with respect to a request to a content provider for a target network resource based, at least in part, on an analysis of the performance data;
receiving an indication that the target client computing device transmitted the request for the target network resource to the content provider; and
in response to the received indication:
generating a prediction that the target client computing device is associated with the target performance category based, at least in part, on the at least one criterion;
transmitting the prediction to the content provider; and
causing the content provider to transmit a version of the target network resource to the target client computing device based, at least in part, on the prediction in response to the request for the target network resource.

Clause 22: The computer-implemented method of Clause 21, wherein the definitions of a plurality of performance categories are generated based on the performance data.

Clause 23: The computer-implemented method of Clauses 21 and 22, wherein the at least one criterion for associating the target performance category with the target client computing device includes latency requirements associated with a specified number of most recent requests for network resources transmitted by the target client computing device.

Clause 24: The computer-implemented method of Clauses 21 to 23, wherein the target computing device is not a member of the plurality of client computing devices.

Clause 25: The computer-implemented method of Clauses 21 to 24, wherein the version of the target network resource transmitted to the client computing device is generated based, at least in part, on a performance characteristic of the target performance category.

Clause 26: A computer-implemented method comprising:
under control of a hardware computing device configured with specific computer executable instructions,
obtaining definitions of a plurality of performance categories for a plurality of client computing devices;
determining at least one criterion for associating a target performance category of the plurality of performance categories with a target client computing device with respect to a request for a target network resource; and
in response to receiving an indication that the target client computing device transmitted the request for the target network resource:
generating a prediction that the target client computing device is associated with the target performance category based, at least in part, on the at least one criterion, wherein a content provider transmits one of a plurality of versions of the target network resource to the target client computing device based, at least in part, on the prediction.

Clause 27: The computer-implemented method of Clause 26, wherein generating the prediction comprises analyzing at least one portion of the performance data associated with the target client computing device in accordance with the at least one criterion.

Clause 28: The computer-implemented method of Clause 27, wherein generating the prediction further comprises obtaining the at least one portion of the performance data from at least one of the target client computing device or a content provider that fulfilled at least one network resource request submitted by the target client computing device.

Clause 29: The computer-implemented method of Clauses 26 to 28, wherein the at least one criterion is related to performance category information associated with a specified number of most recent requests for network resources transmitted by the target computing device.

Clause 30: The computer-implemented method of Clause 29, wherein the specified number of most recent requests for network resources are fulfilled by the content provider.

Clause 31: A system comprising:
a data store configured to at least store computer-executable instructions; and
a hardware processor in communication with the data store, the hardware processor configured to execute the computer-executable instructions to at least:
obtain definitions of a plurality of performance categories for a plurality of client computing devices;
determine at least one criterion for associating a target performance category of the plurality of performance categories with a target client computing device with respect to a request for a target network resource; and
in response to receiving an indication that the target client computing device transmitted the request for the target network resource:
generate a prediction that the target client computing device is associated with the target performance category based, at least in part, on the at least one criterion, wherein a content provider transmits one of a plurality of versions of the target network resource to the target client computing device based, at least in part, on the prediction.

Clause 32: The system of Clause 31, wherein the at least one criterion is related to performance data associated with the target client computing device and wherein the performance data comprises at least one of process information, memory information, network data, resource data, or client computing component information.

Clause 33: The system of Clauses 31 and 32, wherein the indication that the target client computing device transmitted the request for the target network resource is received from at least one of the target client computing device or the content provider.

Clause 34: The system of Clauses 31 to 33, wherein the hardware processor is further configured to execute the computer-executable instructions to at least cause the content provider to select the one of the plurality of versions of the target network resource in accordance with the target performance category.

Clause 35: The system of Clauses 31 to 34, wherein the hardware processor is further configured to execute the computer-executable instructions to at least generate the prediction based, at least in part, on performance data associated with a second client computing device.

Clause 36: A non-transitory computer readable storage medium storing computer executable instructions that when executed by a processor perform operations comprising:
obtaining definitions of a plurality of performance categories for a plurality of client computing devices;
determining at least one criterion for associating a first performance category of the plurality of performance categories with a target client computing device with respect to a request for a target network resource; and
in response to receiving an indication that the target client computing device transmitted the request for the target network resource:
generating a first prediction that the target client computing device is associated with the first performance category based, at least in part, on the at least one criterion, wherein a content provider transmits one of a plurality of versions of the target network resource to the target client computing device based, at least in part, on the first prediction.

Clause 37: The non-transitory computer-readable storage medium of Clause 36, wherein the operations further comprise generating a second prediction that the target client computing device is associated with a second performance category of the plurality of performance categories.

Clause 38: The non-transitory computer-readable storage medium of Clause 37, wherein the content provider transmits the version of the target network resource based further on the second prediction.

Clause 39: The non-transitory computer-readable storage medium of Clauses 37 and 38, wherein the first and second predictions each are associated with a respective confidence level.

Clause 40: The non-transitory computer-readable storage medium of Clause 39, wherein the operations further comprise transmitting the first prediction to the content provider based, at least in part, on confidence levels associated with the first and second predictions.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method comprising:
   under control of a hardware computing device configured with specific computer executable instructions,
      defining a first performance category based, at least in part, on an analysis of performance data associated with requests for network resources received by a provider of network resources to form a first performance category definition;
      determining a performance characteristic corresponding to the first performance category, wherein the performance characteristic identifies a characteristic of a subset of client computing devices in a plurality of client computing devices that belong to the first performance category;
      generating a prediction that a first client computing device in the plurality of client computing devices that transmitted a request for a target network resource belongs to the first performance category, wherein the prediction is generated without an actual performance category of the first client computing device being known; and
      causing transmission of at least one version of the target network resource to the first client computing device, the at least one version of the target network resource selected by the hardware computing device based, at least in part, on the prediction.

2. The computer-implemented method of claim 1, wherein the first performance category definition comprises an identification of a percentile cutoff corresponding to total processing times.

3. The computer-implemented method of claim 2, wherein the performance characteristic comprises a latency measurement range corresponding to the percentile cutoff.

4. The computer-implemented method of claim 1, wherein the analysis of the performance data comprises a histogram of latencies associated with each network resource request.

5. The computer-implemented method of claim 1, wherein the first performance category is one of a low, medium, or high latency category.

6. The computer-implemented method of claim 1, wherein the at least one version of the target network resource comprises at least one of in-lining Cascading Style Sheets (CSS), an image of a first resolution that is lower than a second resolution available in another version of the target network resource, or first script code that is a simplified version of second script code available in the another version of the target network resource.

7. The computer-implemented method of claim 1, wherein the at least one version of the target network resource comprises at least one of a reference to external Cascading Style Sheets (CSS) from a content delivery network (CDN), an image that is an enhanced version of another version of the image that is available in another version of the target network resource, or first script code that is a complicated version of second script code available in the another version of the target network resource.

8. A system comprising:
  a data store configured to store computer-executable instructions; and
  a hardware processor in communication with the data store, the hardware processor configured to execute the computer-executable instructions to at least:
    define a first performance category based, at least in part, on an analysis of performance data associated with requests for network resources received by a content provider to form a first performance category definition;
    determine a performance characteristic corresponding to the first performance category, wherein the performance characteristic identifies a characteristic of a subset of client computing devices in a plurality of client computing devices that belong to the first performance category;
    generate a prediction that a first client computing device in the plurality of client computing devices that transmitted a request for a target network resource belongs to the first performance category, wherein the prediction is generated without an actual performance category of the first client computing device being known; and
    cause transmission of at least one version of the target network resource to the first client computing device, the at least one version of the target network resource selected by the hardware processor based, at least in part, on the prediction.

9. The system of claim 8, wherein the performance data comprises at least one of process information, memory information, network data, resource data, or client computing component information.

10. The system of claim 8, wherein the first performance category definition comprises an identification of a percentile cutoff corresponding to total processing times.

11. The system of claim 10, wherein the performance characteristic comprises a latency measurement range corresponding to the percentile cutoff.

12. The system of claim 8, wherein the analysis of the performance data comprises a histogram of latencies associated with each network resource request.

13. The system of claim 8, wherein the first performance category is one of a low, medium, or high latency category.

14. The system of claim 8, wherein the at least one version of the target network resource comprises at least one of an image of a first resolution that is lower than a second resolution available in another version of the target network resource, or first script code that is a simplified version of second script code available in the another version of the target network resource.

15. A non-transitory computer readable storage medium storing computer executable instructions that when executed by a processor perform operations comprising:
  defining a first performance category based, at least in part, on an analysis of performance data associated with requests for network resources received by a content provider to form a first performance category definition;
  determining a performance characteristic corresponding to the target performance category, wherein the performance characteristic identifies a characteristic of a subset of client computing devices in a plurality of client computing devices that belong to the first performance category;
  generating a prediction that a first client computing device in the plurality of client computing devices belongs to the first performance category, wherein the prediction is generated without an actual performance category of the first client computing device being known; and
  causing transmission of at least one version of a target network resource to the first client computing device, the at least one version of the target network resource selected by the processor based, at least in part, on the prediction.

16. The non-transitory computer-readable storage medium of claim 15, wherein the first performance category definition comprises an identification of a percentile cutoff corresponding to total processing times.

17. The non-transitory computer-readable storage medium of claim 16, wherein the performance characteristic comprises a latency measurement range corresponding to the percentile cutoff.

18. The non-transitory computer-readable storage medium of claim 15, wherein the first performance category is one of a low, medium, or high latency category.

19. The non-transitory computer-readable storage medium of claim 15, wherein the at least one version of the target network resource comprises at least one of in-lining Cascading Style Sheet (CSS), an image of a first resolution that is lower than a second resolution available in another version of the target network resource, or first script code that is a simplified version of second script code available in the another version of the target network resource.

20. The non-transitory computer-readable storage medium of claim 15, wherein the at least one version of the target network resource comprises at least one of a reference to external Cascading Style Sheet (CSS), an image that is an enhanced version of another version of the image that is available in another version of the target network resource, or first script code that is a complicated version of second script code available in the another version of the target network resource.

21. The system of claim 8, wherein the at least one version of the target network resource comprises in-lining Cascading Style Sheets (CSS).

\* \* \* \* \*